United States Patent [19]

Geurtsen et al.

[11] Patent Number: 4,555,436

[45] Date of Patent: Nov. 26, 1985

[54] HEAT TRANSFERABLE LAMINATE

[75] Inventors: Friedrich H. H. Geurtsen, Holliston; John M. Anemaet, Millis; Donald R. Smith, Hingham; Mary G. Boyd, Framingham, all of Mass.

[73] Assignee: Dennison Manufacturing Co., Framingham, Mass.

[21] Appl. No.: 606,747

[22] Filed: May 3, 1984

[51] Int. Cl.[4] ............ B32B 7/06; C09J 7/02; C09J 7/04

[52] U.S. Cl. ............ 428/200; 156/230; 156/239; 156/240; 427/148; 428/202; 428/204; 428/207; 428/211; 428/348; 428/349; 428/352; 428/354; 428/484; 428/485; 428/488.4; 428/913; 428/914

[58] Field of Search ............ 428/200, 40, 211, 488.1, 428/347, 484, 485, 352, 354, 349, 348, 913, 914, 207, 202, 204, 488.4; 156/239, 240, 230; 427/148

[56] References Cited

U.S. PATENT DOCUMENTS

| | | | |
|---|---|---|---|
| 2,862,832 | 12/1958 | Shepherd, Jr. | 428/347 X |
| 2,989,413 | 6/1961 | Shepherd, Jr. | 428/200 |
| 2,990,311 | 6/1961 | Shepherd, Jr. | 428/211 X |
| 3,516,842 | 6/1970 | Klinker, Jr. et al. | 428/40 |
| 3,616,015 | 10/1971 | Kingston | 428/485 X |
| 3,616,176 | 10/1971 | Jachimowicz | 428/200 |
| 3,944,695 | 3/1976 | Kosaka et al. | 428/488.1 |
| 4,322,467 | 3/1982 | Heimbach et al. | 428/488.1 X |

*Primary Examiner*—Thomas J. Herbert
*Attorney, Agent, or Firm*—Barry D. Josephs

[57] ABSTRACT

An improved release formulation for use in a heat transferable laminate wherein an ink design image is transferred from a carrier support to an article by application of heat to the carrier support. On transfer the release splits from the carrier and forms a protective coating over the transfered design. The improved release is coated onto the carrier as a solvent based-wax release. The release coating is then dried to evaporate the solvent contained therein. The improved release has the property that its constituents remain in solution down to temperatures approaching ambient temperature. Upon transfer, the release forms a protective coat which may be subjected to hot water. The improved release contains a montan wax, a rosin ester or hydrocarbon resin, a solvent, and ethylene-vinyl acetate copolymer having a low vinyl acetate content.

17 Claims, 3 Drawing Figures

HEAT TRANSFERABLE LAMINATE

BACKGROUND OF THE INVENTION

1. Field of the Invention

The present invention relates to a heat transferable label and improved release composition therefor.

2. Description of the Prior Art

Prior art heat transferable labels for imprinting designs onto an article typically involve decorative laminates consisting of a paper base sheet or web coated with a wax or polymeric release layer over which a design is imprinted in ink.

U.S. Pat. No. 3,616,015 is illustrative of the prior art. In U.S. Pat. No. 3,616,015 a label-carrying web such as a paper sheet includes a heat transferable label composed of a wax release layer affixed to a surface of the paper sheet and an ink design layer superimposed onto the wax release layer. In the heat transfer labelling process for imprinting designs onto articles, the label-carrying web is subjected to heat, and the laminate is pressed onto an article with the ink design layer making direct contact with the article. As the web or paper sheet is subjected to heat, the wax layer begins to melt so that the paper sheet can be released from the wax layer. After transfer of the design to the article, the paper sheet is immediately removed, leaving the design firmly affixed to the surface with the wax layer exposed to the environment. The wax release layer should not only permit release of the transferable label from the web upon application of heat to the web but also form a clear, protective layer over the transferred ink design.

This commonly assigned patent discloses a wax release coating containing a modified montan wax which has been oxidized, esterified, and partially saponified. Paraffin wax, microcrystalline wax, and a rosin ester are included in the wax blend along with the montan wax. The release formulation is prepared without the inclusion of a solvent. It is, therefore, prepared as a hot melt mixture and is applied as a hot melt onto the carrier. In order to attain improved clarity of the transferred ink design, the transferred wax coating over the ink design is subjected to additional heat processing after the label has been transferred onto the article. The additional processing involves postflaming, wherein the transferred wax coating is subjected to jets of high temperature gas either as direct gas flame or as hot air jets at temperatures of about 300° F. to 400° F. for a period of time sufficient to remelt the wax coating without substantially heating the bottle. Upon cooling of the remelted wax coating through use of ambient or forced cooled air, the cooled wax layer solidifies to form a clear, smooth, glossy, protective coating over the transferred ink design. After the design is transferred onto an article, the transferred release layer which now forms a protective coat over the design cannot be subjected to hot water for significant duration since this would tend to melt the release and consequently dull the transferred release. U.S. Pat. No. 3,616,015 is herein incorporated by reference.

U.S. Pat. No. 3,516,842 discloses a heat transfer label which is heat transferable from a paper carrier sheet to a plastic bottle. This reference discloses a wax-like release layer which may be composed of any one of three compositions: (I) the release disclosed may be composed of a slightly oxidized, low molecular weight polyethylene wax (col. 2, line 65 to col. 3, line 3); or (II) the release layer may be of an unoxidized hard wax, which wax after deposition on the paper carrier has been subjected to corona discharge (col. 3, lines 4–13); or (III) the release layer may be a blend of ethylene-vinyl acetate (EVA) copolymer and a paraffin wax (col. 3, lines 14–21). These release compositions do not provide sufficient adhesion to uniformly bond to the ink design layer or intermediate lacquer coating which may be included between the release layer and ink design layer. The above release compositions do not exhibit the required high degree of film integrity during the heat transfer of the print image to the receiving article. Lack of sufficient film integrity results in shrinkage of the release layer during transfer and distortion of the transferred image.

U.S. Pat. No. 2,989,413 discloses a heat transferable laminate employing a release layer composed of an unoxidized Fisher-Tropsch wax. The unoxidized wax is employed as a release layer without incorporation of other wax or resin additive. The use of unoxidized waxes alone in release coatings for heat transferable laminates has proved to be unsatisfactory. The unoxidized wax alone does not exhibit sufficient adhesion to uniformly bond to the ink design or intermediate lacquer coating to the release surface.

U.S. Pat. No. 2,990,311 discloses a heat transferable decal having a release transfer layer composed of a mixture of a crystalline wax and a synthetic thermoplastic film-forming resin, principally an organic linear thermoplastic film-forming resin which is substantially water insoluble. The degree of compatibility of the resin and wax is controlled through selection and ratio of the components to give heat transfers of either the hot-peel or cold-peel type. In the hot-peel transfer, the decal will adhere and release from the backing only immediately after application while the decal is still hot. In the cold-peel transfer, the transferred decal will adhere to the receiving surface when hot but will only release and transfer by peeling away the backing after the transfer has cooled. In either type of transfer, this reference teaches that resins and waxes (the latter being used for the release layer) should be mutually incompatible or insoluble at temperatures below the melting temperature of the wax such that the molten wax, upon cooling, will actually crystallize separately and distinctly from the resin.

Suitable resins specifically disclosed are polyvinyl acetate, polyethyl acrylate, polymethyl acrylate, polyethyl methacrylate, polypropyl methacrylate, polybutyl methacrylate, styrenebutadiene, acrylonitrile-butadiene, polychloroprene rubbers, polyvinyl butyral, ethyl cellulose, and polyvinyl acetate vinyl stearate copolymer (col. 5, lines 38–44). The reference teaches that the wax component should be a material which derives its crystallinity mainly from the presence of long hydrocarbon chains.

Specific waxes disclosed as suitable are beeswax, candelilla wax, carnauba wax, hydrogentated castor oil, montan wax, paraffin wax, low molecular weight polyethylene, oxidized microcrystalline wax, and hard wax or derivatives thereof obtained from the Fischer-Tropsch synthesis. (col. 5, lines 45-56). This reference does not disclose applicant's formulation for the release layer nor does it contemplate the advantages which applicant has derived from such formulation.

U.S. Pat. No. 2,862,832 discloses a heat transferable decal having a release layer composed of an oxidized wax. The disclosure is directed principally to defining the type of wax found to provide suitable release of the decal from the carrier web upon application of heat. The wax disclosed in this reference is an oxidized wax obtained as the reaction product of the oxidation of hard, high melting, aliphatic, hydrocarbon waxes. The oxidized waxes are defined as the oxidation products of both natural and synthetic hydrocarbon waxes such as petroleum waxes, low molecular weight polyethylene and waxes obtained from the Fisher-Tropsch synthesis. Suitable waxes may include oxidized microcrystalline wax or the esterification product of an oxidized hydrocarbon wax. The oxidized waxes are disclosed as those having melting points between about 50° C. and 110° C., saponification values between about 25 and 100, acid values between about 5 and 40, and penetrometer hardness (ASTM D5-52) below about 51 as measured with 100 grams for 5 seconds at 25° C. This reference does not disclose applicant's release formulation nor does it recognize or contemplate the advantages obtained from such formulation.

U.S. Pat. No. 3,616,176 discloses a heat transfer laminate of a type related to that disclosed in U.S. Pat. No. 3,616,015. In U.S. Pat. No. 3,616,176 the laminate is composed of a base sheet, with a polyamide layer covering the base sheet and a decorative ink layer covering the polyamide layer. Sufficient heat is applied to the laminate to heat the polyamide layer at or above a softening point, and the laminate is then pressed onto the surface of an article with the decorative ink layer coming into direct contact. Upon withdrawal of the heat source, the polyamide layer cools to a temperature below the softening point and the base sheet is removed. The decorative layer becomes fused or heat sealed to the article. The polyamide layer in this disclosure functions as a release coating which allows transfer of the decorative layer onto an article and upon cooling serves as a protective coating layer over the transferred decorative layer. The use of a polyamide release coating has the principal disadvantage in that there is a significant tendency for the polyamide to form a noticeable halo around the transferred decorative layer. Also, the polyamide layer even when subjected to additional processing such as postflaming does not form a sufficiently clear coating that would aesthetically permit heat transfer labelling onto clear articles or bottles.

U.S. patent application Ser. No. 06/501454 filed 06/06/83, now abandoned entitled Heat Transferable Laminate, commonly assigned with the present application, discloses a heat transferable release formulation containing, inter alia, a montan wax and an ethylene-vinyl acetate copolymer binder. The release formulation disclosed in this application is prepared and applied to the carrier web as a hot melt; i.e. without the use of solvent and is, therefore, of a different type release than the solvent-based wax release of the present application.

U.S. patent application Ser. No. 06/544024 filed 10/20/83, now U.S. Pat. No. 4,536,434 entitled Heat Transferable Laminate, commonly assigned with the present invention, contains relevant disclosure pertaining to the method of transferring the laminate to a receiving article and postheating the transferred laminate on the article. The improved heat transferable release disclosed therein is of a markedly different type than the formulation of the present invention in that it does not employ a montan wax and it is prepared and applied to the carrier web as a hot melt; i.e. the release formulation does not contain a solvent during its application onto the carrier web.

Accordingly, it is an object of the present invention to provide an improved release for heat transferable laminates wherein the release is a solvent-based wax formulation.

It is an object of the invention that the release coating prior to drying has a low gel point approaching ambient temperature.

It is another object that the release coating be heat transferable so that it forms a clear, hard, glossy protective coating exhibiting improved scuff resistance.

It is an important objective that the release coating after transfer withstand exposure to hot water.

SUMMARY OF THE INVENTION

In accomplishing the foregoing and related objects, the invention provides a transferable laminate having an improved release composition. The heat transferable laminate is typically affixed to a carrier web, such as paper or a plastic sheet. The transferable laminate is composed of a release layer coated on the carrier web, an ink design layer and preferably an adhesive coating over the ink design. An optional-lacquer barrier layer may also be included between the release layer and ink design layer. As heat and pressure are applied to the laminate in contact with an article such as a glass or plastic container, the release layer softens allowing the laminate which contains the decorative ink design to transfer onto the article to be decorated. The release coating splits from the carrier so that it forms a uniform clear, glossy protective coating over the transferred ink design layer after the release layer resolidifies. The transfer laminate can be subjected to postflaming to improve the smoothness of the transferred release which forms the protective coating.

Applicants have formulated a wax-based release employing a montan wax in a solvent system which exhibits properties which are quite surprising and contrary to conventional expectations. The difficulty of dissolving a hard wax, such as montan wax, in solvent at wax concentrations greater than about 10 percent by weight is an established fact. Although it may be possible to dissolve a montan wax in a solvent at these higher wax concentrations at elevated temperatures, it would not be expected that the wax would remain dissolved in solution as the solution temperature is subsequently lowered to less than about 140° F. Conventional expectation would be that, even if a system could be formulated which would permit greater than 10 percent by weight concentration of montan wax to become fully dissolved therein, then once the solution was formed and its temperature subsequently lowered, the gel point of the solution, that is the temperature at which the wax begins to come out of solution, should be above about 140° F. Applicants have discovered a system which permits greater than 10 percent by weight of montan wax and preferably between about 16 percent to 20 percent by weight of montan wax to become dissolved therein and which allows the wax in the solution to remain dissolved therein even if the temperature of the solution is lowered to a level below 140° F. In fact, it has been determined quite unexpectedly that in Applicants' formulation the gel point is much below that of 140° F. and approaches that of ambient temperature typically a temperature as low as about 75° F. A system which permits greater than 10 percent wax, preferably 15 percent to 20 percent by weight of montan wax to become dissolved therein and which system has a gel point temperature of less than 140° F. would per se be considered a novel formulation having an unexpected property. Since the wax component in the improved release formulation remains in solution even at temperatures between about 75° F. and 140° F. and since the solution has a gel point as low as about 75° F., typically between about 75° F. to 85° F., the improved solvent-based wax release formulation of the invention has the advantage that it can be coated onto a carrier sheet at near ambient temperature (above gel point). This eliminates the expense and problems of maintaining the release solution at high temperatures during the coating operation.

An additional, important advantage of the improved release formulation is that, after it is coated onto the carrier sheet and subsequently dried to evaporate all of the solvents therein, a wax-based release of higher melting point, e.g. a minimum drop melting point greater than about 95° C. is obtained. The resulting melting point of the dried release coating is higher than that obtained with conventional heat transferable wax release coatings, e.g. such as those commonly applied in a hot melt state. The higher melting wax release layer permits the substrate transferred to an article to be subjected to hot water washing or elevated temperatures up to about 160° F. for durations greater than six minutes without causing dulling or distortion in the transferred design image. Additionally, the improved release formulation exhibits all other desirable properties required of a heat transferable release. These properties include the ability of the release to split uniformly from the carrier upon application of heat thus permitting transfer of the ink design layer and resulting in formation of a uniform clear, glossy coating over the transferred ink design layer. The transferred release also forms a hard, protective coating over the transferred ink design layer, protecting the ink design from abrasion and chemical corrosion.

The transferred release exhibits markedly improved surface scuff and abrasion resistance over the conventional wax-based release coatings, for example hot melt-type wax release coatings. The improvement in scuff and abrasion resistance is, in part, a result of the higher melting release and, in part, due to the difference in composition. Thus, manual rubbing of the transferred substrate on the article will not cause the wax protective coating to scuff.

The improved release formulation having the aforementioned advantages and unique properties is prepared as a solution containing (a) a montan wax or equivalent hard wax; (b) a film-forming binder; (c) a plasticizer-binder; and (d) solvents. A preferred montan wax is an oxidized, partially esterified, and partially saponified montan wax. The montan wax is present in the solution in an amount over 10 percent by weight, preferably between about 16 to 20 weight percent. The film-forming binder component is preferably a rosin ester, such as pentaerythritol ester of rosin. (Rosin is rich in resinous acids such as abietic and pimaric acid having a phenanthrene nucleus). Alternatively, the film-forming binder may be composed of a hydrocarbon resin formed by the polymerization of pure hydrocarbon monomer and hydrogenation of the polymerized product. The film-forming binder component is desirably present in the solution in an amount between about 17 to 21 percent by weight. The plasticizer-binder component in the release formulation is composed of ethylene-vinyl acetate copolymer. It has been determined that the vinyl acetate content in the ethylene-vinyl acetate copolymer should be less than about 24 percent by weight of the copolymer. A preferred vinyl acetate content is between about 17.5 and 18.5 percent by weight of the ethylene-vinyl acetate copolymer. The ethylene-vinyl acetate copolymer may be present preferably in a range between about 2 to 4 percent by weight of the solution. Consequently, the solvent may make up between about 55 to 65 percent by weight of the solution. A preferred solvent has been determined to be toluene.

DETAILED DESCRIPTION

Figure 1:
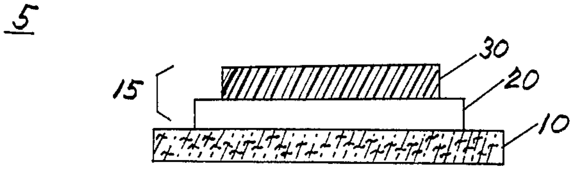
FIG. 1 is an illustation of a preferred embodiment of the composite heat transferable laminate.
Figure 2:
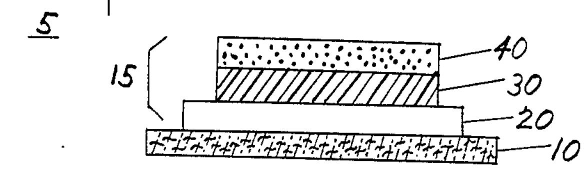
FIG. 2 is an illustration of another preferred embodiment of the composite heat transferable laminate, with adhesive coating layer.
Figure 3:
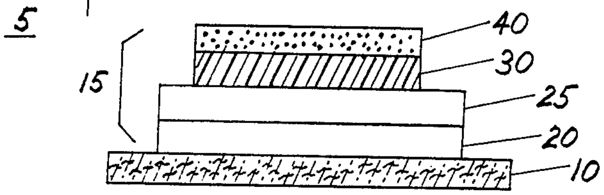
FIG. 3 is an illustration of an embodiment of the composite heat transferable laminate with optional intermediate layers.

A preferred embodiment of the heat transferable laminate (5) of the invention as illustrated in FIG. 1 is composed of a carrier web (10), typically paper, overcoated with release layer (20) and ink design layer (30). It is more preferable to overcoat ink design layer (30) with an adhesive layer (40) as illustrated in FIGS. 2 and 3. It is also preferable to include a barrier coating layer (25) between release layer (20) and ink design layer (30) as illustrated in FIG. 3. Release layer (20) and ink design layer (30) together with the optional barrier layer (25) and adhesive coating (40) form a transferable substrate (15), which releases from carrier web (10) upon application of heat to web (10) sufficient to melt release layer (20).

The improved release layer (20) of the invention is a solvent-based wax release coating which is coated onto carrier (10). Release layer (20) may be coated uniformly over the surface of carrier (10). However, it is preferable to coat release layer (20) in discrete patches by conventional printing methods such as the gravure method to reduce wastage of unused material. The release coating patches will then overlap only slightly the imprinted ink design layer (30) for each one of the substrates (15). After the release coating (20) has been applied onto carrier web (10), the coating is subjected to convective drying to evaporate all of the solvents contained therein. The dried wax-based release layer (20) on carrier web (10) is then passed through to subsequent coating stations, preferably gravure printing stations, wherein the remaining layers, which include optional adhesive coating layer (40) are printed in sequence onto the dried release layer (20).

After the composite laminate (5) has been formed, the substrate portion (15) may then be transferred onto a receiving article. Substrate (15), which includes ink design layer (30) is transferred from carrier (10) onto a non-fibrous receiving article such as a plastic or glass bottle. Substrate (15) is typically transferred by rolling pressure from a conventional heated surface, such as heated platen or hot roller, which presses against the exposed surface of paper web (10) while ink design layer (30) or adhesive layer (40) is in contact with the receiving article. The hot platen or roller is heated to a temperature sufficient to tackify ink layer (30) if an adhesive layer is not employed or else sufficient to tackify adhesive layer (40) if such layer is included and simultaneously sufficient to melt release layer (20). The platen or roller is heated to a temperature of between about 300° F. to 600° F., preferably between about 300° F. to 450° F. The contact time of the heated platen on the carrier (10) is of very short duration to permit continual high speed production of labelled articles. The preferred contact time of the heated platen to effect transfer of substrate (15) to an article is less than one or two seconds, and typically about 0.1 second or somewhat less. Carrier web (10), typically of paper, is then removed from release layer (20). Substrate (15) remains in permanent contact with the article with ink design layer (30) forming the transferred image on the surface of the article. During transfer, release layer (20) splits on the carrier, forming a uniform protective coating over the transferred ink design layer (30). If a barrier layer (25) is employed, as in FIG. 3, release layer (20) similarly leaves a uniform protective coating over the transferred barrier layer (25) as substrate (15) is transferred onto the receiving article.

After the ink design layer (30) has been transferred onto the receiving article, it is preferable to subject the transferred substrate (15) to a postheating or postflaming step. Although optional, the postheating step is preferably employed to enhance the appearance of the transferred image (30) on the receiving article. This step removes microscopic hills and valleys from the surface of transferred release coating (20), thus forming a very smooth, protective coating over the transferred design image. In the postflaming step, transferred substrate (15), including transferred wax release layer (20), is typically exposed to jets of hot gas, either as a direct gas flame or hot air jets for a brief period. Hot air, hot gas, or infrared heating between about 400° F. and 3000° F. is preferred. The postflaming step is less than several seconds in duration, preferably less than about 0.1 or 0.2 second, typically less than about 0.15 second. This period of time is sufficient to melt the transferred release layer (20), forming a smooth, protective coating over the transferred design layer (30), yet without causing surface distortion on the receiving article. The short transfer contact time and short postflaming period permit high-speed production of the decorated article. The postflaming step may be carried out in a manner set forth in U.S. Pat. No. 3,616,015.

The improved release coating (20) of the present invention, in addition to having properties which permit the aforementioned operation to be carried out, has an additional important advantage over conventional wax-based release coatings. The dried release coating (20) has a higher melting point than is attained with a conventional wax-based release coating, such as with hot melt wax-based release, i.e. wax-based release that does not contain solvents at any time during application. The higher melting point is not so high as to prevent efficient release of substrate (15) upon application of a hot platen or roller to carrier (10) under the preferred operating conditions, as above-described. The melting point (drop point) of the dried release coating (20) is preferably between about 95° to 105° C.

The higher melting point of the dried release layer (20) has an important application in that it allows the transferred substrate (15) to be subjected to elevated temperatures such as exposure to hot water for long periods of time without causing any distortion in the transferred ink design (30). It is often a requirement that the transferred substrate (15) on the receiving article be exposed to elevated temperatures such as hot water washing, which would cause distortion in the transferred design (30) unless the release coating (20) had sufficiently high melting point. Hot water washing of the transferred substrate (15) on a receiving article is commonly required when the receiving article is a bottle or container for cold liquids such as cold soft drinks and the like. It is common practice for the manufacturer of carbonated beverages such as soda pop, to fill the bottles with the beverages already in a cooled state. Otherwise the carbonated gas contained in the beverage would escape from the beverage prior to filling the bottles. Filling of bottles with cold liquids often causes the surface of the bottles to become coated with moisture condensed from the atmosphere as the bottles are placed in storage or into shipment cartons. Thus, manufacturers of cold carbonated beverages, in order to obviate this problem, have generally found it necessary to treat the filled bottles with hot water, thus heating the surface of the bottles which, in turn, prevents moisture from the atmosphere from condensing on the bottles. Since it is desirable to imprint bottles for carbonated beverages with the transferable laminate of the invention, it is a requirement that the transferred release coating (20) resist melting and dulling as the imprinted bottles are subsequently subjected to hot water washing. Although the laminate of the present invention because of its higher melting release has particular advantage in application to bottles containing cold carbonated beverages, the laminate is equally suitable for conventional application to plastic or glass surfaces which need not be subjected to subsequent hot water washing. Thus, the present improved formulation for release coating (20) can be used without alteration in the formulation, irrespective of whether the receiving articles are to be exposed to subsequent hot water washing.

The improved formulation for release coating (20) has an additional advantage over wax-based release coatings which do not contain solvents in the original coating. The latter is known in the art as hot melt wax release coatings. Since the release coating (20) contains solvents in the coating mixture during its application onto carrier (10), it is more easily coated onto carrier (10) in discrete patches by conventional gravure printing techniques. The printing of release layer (20) onto carrier (10) in discrete patches markedly reduces the amount of wastage of release material. It is far more difficult and more costly to apply hot melt wax release type coatings in discrete patches onto a carrier by conventional printing techniques. Thus the improved release formulation not only has a wider application than hot melt wax-based release coatings but may also be easily applied as discrete coating patches using conventional printing methods.

The solvent-based wax release formulation of the present invention for release coating (20) is composed of (a) a release component; (b) a film-forming thermoplastic binder; (c) a plasticizer-binder; and (d) solvents. The solvent component contained in this formulation is evaporated as above-described by convectively heating the coating (20) after the release composition has been applied onto carrier (10). The release component in the formulation is preferably composed of a montan wax, a coal (lignite)-derived wax characterized by high concentration of montanic acid ($C_{28}H_{56}O_2$). The preferred montan wax is an oxidized, esterified, partially saponified montan wax of the type disclosed in U.S. Pat. No. 3,616,015, herein incorporated by reference. Montan waxes of this type have melting points (drop points)

typically between about 50° C. and 100° C., saponification values between about 25 and 150, acid values between about 5 and 40, and penetrometer hardness (ASTM-D 1321-57T) below about 15 mm. as measured with 100 grams for 5 seconds at 25° C. These montan waxes also have relatively high melt viscosity. An illustrative oxidized, esterified, partially saponified montan wax is available under the tradename Hoechst OP or Hoechst X55 modified montan wax from the Hoechst Chemical Co. Hoechst OP modified montan wax has a drop point (ASTM-D 127) of 212° F. to 221° F., a congealing point (ASTM-D 938–49) of between 165° F. and 175° F., an acid number of 10 to 15, and a saponification number of 90 to 110. These waxes have melt viscosities of at least about 150 centipoises at a temperature of about 25° F. above their solidification point.

The film-forming binder component for the release binder component (b) for the improved release composition is preferably composed of a rosin ester. A preferred rosin ester has been determined to be pentaerythritol ester of rosin. Rosin is known to be rich in resin acids, typically of the abietic and pimaric types having the general formula $C_{19}H_{29}COOH$ and having a phenanthrene nucleus. Preferred pentaerythritol ester of rosin for use as the film-forming binder component is available under the tradename PENTALYN 344 or PENTALYN A from the Hercules, Inc. PENTALYN 344 rosin ester is a thermoplastic pentaerythritol ester of stabilized resin acids. It has a softening point (drop point) between about 99° C. to 108° C., a color-USDA rosin scale of N Max, an acid number of 15 Max, a color Gardner number of 10 Max in a 60 percent solid solution in mineral spirits. PENTALYN A rosin ester is a preferred alternative rosin ester of pentaerythritol and refined rosin. It has a typical softening point (drop point) of between about 109° C.. to 116° C., a color rating on the USDA rosin scale of M max, an acid number of between about 6 to 16, and a color Gardner number of about 11 Max in a 60 percent solid solution in mineral spirits. The Gardner Holdt viscosity at 25° C. of a 60 percent solid solution in mineral spirits for the PENTALYN 344 rosin ester is at a level of between about C–G and the Gardner Holdt viscosity for the PENTALYN A rosin at 60 percent solid solution is at a level between about E–H.

An alternative composition for the film-forming binder has been determined to be a hydrocarbon resin which is produced by the polymerization of pure hydrocarbon monomer. The polymerized hydrocarbon is subsequently hydrogentated forming a crystal clear resin. The preferred hydrocarbon resin is formed from unsaturated cyclic hydrocarbon, such as aromatic hydrocarbons, which are polymerized and then hydrogenated. Preferred hydrocarbon resins of this type are formed of styrene monomers which are polymerized and subsequently hydrogenated, and are available under the tradename REGALREZ hydrocarbon resins from the Hercules Company, Wilmington, Del. The REGALREZ hydrocarbon resin grade 3102 has been determined to be particularly suitable for use as the film-forming binder component (b). The REGALREZ-3102 grade hydrocarbon resin has a ball and ring softening point of between about 98° C. to 106° C., an acid number of less than 1.0, saponification number of less than 1.0, a specific gravity of 1.04 (at 21° C.), a glass transition of about 50° C., a melt viscosity of about 100 poise at 150° C., and is crystal-clear in color.

The plasticizer-binder component for the improved release composition (20) is preferably composed of ethylene-vinyl acetate copolymer (EVA resin). The preferred ethylene-vinyl acetate copolymer resin has a low vinyl acetate content, preferably at a level of less than about 24 percent by weight of the copolymer. A preferred vinyl acetate content in the ethylene-vinyl acetate copolymer is between about 17.5 to 18.5 percent by weight. A preferred ethylene-vinyl acetate copolymer resin having a vinyl acetate content in the latter preferred range is available under ELVAX-410 tradename form the E. I. DuPont Company.

The solvent component must be a solvent for each of the above components in the formulation. The preferred solvents are those which result in a relatively low dissolving temperature for the remaining components in the release formulation. A preferred solvent has been determined to be toluene. Applicants have determined that if the solvent-based wax release formulation is dissolved at its dissolving temperature and the resulting solution is then heated to a higher temperature, the gel point temperature of the solution will decrease to a value markedly less than what it would have been if the solution was not heated to a temperature above the dissolving temperature. The same effect is achieved if the waxrelease formulation is dissolved directly at the higher temperature.

It has been found desirable to heat the solvent-based wax release formulation to a temperature above its dissolving temperature, typically above about 140° F. to 160° F. (The dissolving temperature is the lowest temperature at which a homogeneous solution is formed.) It has been found preferable to heat the solvent-based wax release formulation to a temperature above the dissolving temperature up to a higher temperature of about 300° F. or somewhat higher. Advantageously, the solvent-based wax release composition should be left to solvate at the higher temperature, preferably at a temperature above about 250° F., typically about 250° F. to 280° F., for a period of at least about five minutes, which results in a homogeneous solution. Preferably, the solution is left to solvate at about 260° F. for a period between about twenty to thirty minutes. Longer solvation time may be employed, e.g. one hour or longer, but in that case evaporated solvent must be replaced periodically. Surprisingly, if the solvent-based wax release formulation is subjected to higher than dissolving temperatures, preferably a higher temperature between about 250° F. to 300° F., for at least about five minutes, the gel point of the resulting solution on cooling decreases to a gel point value of about 75° F. to 100° F., typically 75° F. to 85° F. (The gel point of the solution would be 140° F. if the solution was simply formed at the dissolving temperature.) Lowering of the gel point temperature of the solution by processing the solution as above-described was a wholly unexpected result. At present, a chemical or physical mechanism which could plausibly account for this surprising result has not been postulated.

A preferred solvent-based wax release formulation for release layer (20) is set forth in Table I. Although the composition shown in Table I illustrates a preferred composition, Applicants have determined that a release composition having the required properties may be obtained if the montan wax component is present in the formulation prior to drying (Table I) in a range between about 16 to 20 percent by weight. The pentaerythritol ester of rosin, e.g. preferably PENTALYN 344 or PENTALYN A rosin ester may be present in this formulation in a range between about 17 to 21 percent by weight. The ethylene-vinyl acetate copolymer, e.g. ELVAX 410 may be present in the formulation in a range between about 2 to 4 percent by weight. The solvent, preferably toluene, is desirably present in the formulation in a range between about 50 to 70 percent by weight.

The preferred mixture, illustrated in Table I, may be prepared by simply blending the release component, film-forming binder, plasticizer-binder, and solvent at room temperature in the proportions shown in the table. The mixture is stirred for a short period at room temperature until a homogeneous mixture is obtained and the blend is then placed in an oven and subjected to temperatures of about 260° F., at which temperature the release component, film-forming binder, and plasticizer-binder all become dissolved in the solvent component, thus forming a homogeneous solution. Once dissolved, the constituents will remain in solution until the temperature of the solution is lowered and the gel point temperature is reached. The gel point temperature of the release formulation shown in Table I is about 75° F. Consequently, the solvent-based wax release formulation as shown in Table I can be coated onto carrier (10) by conventional printing methods, such as the gravure method, at a temperature that is above the gel point temperature of about 75° F. The release composition is conveniently coated onto carrier (10) typically at a temperature between about 85° F. to 120° F. After the release mixture in accordance with the formulation set forth in Table I is coated over carrier (10), the release coating is then subjected to convective heating, typically above about 250° F., whereupon the solvent contained in the coating evaporates, leaving a dry release coating layer (20) on carrier 10. The dried release layer 20 has a basis weight typically of between about 2.5 to 3.6 lbs./ream (3,000 sq. ft./ream). Thereupon, the other coating layers as shown in the figures are coated sequentially, preferably by gravure, over the release coating (20) to form the composite laminate (5).

An optional, lacquer-based barrier coating (25) may be printed by gravure over release coating (20). The presence of a barrier layer (25) may be advantageously included to reduce the chance of seepage of ink from design layer (30) into the release layer (20) and it affords increased protection for the design layer. A preferred barrier composition contains a mixture of a linear, multiaromatic acid-based polyester together with a rosin ester. A preferred multiaromatic acid-based polyester for optional barrier coating (25) is available under the tradename VITEL PE-200 or VITEL PE-222 from the Goodyear Co., of Akron, Ohio. A preferred rosin ester which is preferably blended in with the multiaromatic acid-based polyester is preferably a rosin ester formed by reaction of polyhydric alcohol, maleic anhydride or phenol aldehyde and rosin acid, such as abietic and pimaric acid. The rosin ester is preferably composed of methyl abietate, methyl hydroabietate, glyceryl-based hydroabietate or ester gum. A preferred polymer of this type is sold under the trademark NEOLYN 23-75T from Hercules Chemical Co. of Wilmington, DE. A preferred composition for optional barrier layer 25 is composed of a mixture of about 75 percent by weight of the VITEL polyester and about 25 percent by weight of the NEOLYN rosin ester on a dry basis. Usually the barrier coating is applied wet, that is dissolved in suitable solvent, typically composed of toluene and methyl ethyl ketone. After the optional lacquer-barrier coating (25) has been applied, it is subjected to drying to evaporate the solvents contained therein. Thus, barrier coating (25), if employed, further protects the design layer (30) from chemical corrosion, such as spillage of caustic or chemically-active liquids on the surface of the transferred label.

Ink design layer (30) is applied such that the release layer (20) overlaps the ink design layer as shown in the figures. The ink design layer (30) may be coated by conventional coating techniques, such as reverse roll coating, letter press, and flexographic techniques, but the gravure method is preferred. Ink design layer (30) may be composed of any conventional ink of any color. The ink may typically include resinous binder bases compatible with the pigment employed. The ink binder may be selected from a wide variety of conventional resinous bases, such as polyamide, polyvinyl chloride, acrylics, and polyamide nitrocellulose. An adhesive coating (40) is preferably coated over ink design layer (30) to facilitate transfer of substrate (15) to the article to be decorated. Thus, substrate (15) is therefore typically composed of release layer (20), ink design layer (30), and adhesive layer (40) as illustrated in FIG. 2, and may optionally include a lacquer-barrier layer (25) as illustrated in FIG. 3. Adhesive layer (40) may suitably be composed of a thermoplastic polyamide adhesve. A preferred thermoplastic polyamide adhesive is composed of the reaction product of a diamine with a dimerized fatty acid, such as that available under the tradename VERSAMID 900 Series from General Mills Chemicals Inc. of Minneapolis, Minn. In forming adhesive layer (40), it is advantageous to combine the polyamide component with a nitrocellulose base. Adhesive layer (40) may be coated onto the ink design layer (30) by conventional coating techniques which include reverse roll coating and the gravure printing method.

Although the invention has been described in the context of particular embodiments for a transferable substrate, the invention is not intended to be limited to any particular layer structure for the transferable substrate. It is known that the transferable substrate may contain other coating layers, for example, a plurality of ink design layers or a plurality of lacquer-barrier type layers between the ink design layer and the release layer. The invention is equally applicable to such varying heat transferable substrates. The invention is also applicable to heat transferable laminates wherein the adhesive components are added to the ink design layer itself, thereby obviating the need for a separate adhesive coating layer. It should be appreciated, therefore, that the improved release formulation of the invention has a wide application as a release coating for any heat transferable substrate in contact with a support member, wherein a clear, glossy appearance is desired for the transferred image. The invention, therefore, is not intended to be limited to the description in the specification, but rather is defined by the claims and equivalents thereof.

TABLE I

| | Wt. % |
|---|---|
| RELEASE COATING (20) - Prior To Drying | |
| (a) Release Component<br>Montan Wax<br>(e.g. Hoechst OP or Hoechst X55 Wax) | 18 |
| (b) Film-Forming Binder<br>Rosin Ester<br>(e.g. Pentaerythritol ester of rosin | 19 |

TABLE I-continued

| | Wt. % |
|---|---|
| PENTALYN 344 or PENTALYN A) | |
| (c) Plasticizer-Binder Ethylene-vinyl acetate copolymer (e.g. ELVAX 410) | 3 |
| (d) Solvent (e.g. Toluene) | 60 |
| | 100 |
| RELEASE COATING (20) - After Drying | |
| (a) Release Component Montan Wax (e.g. Hoechst OP or Hoechst X55 Wax) | 45.0 |
| (b) Film-Forming Binder Rosin Ester (e.g. PENTALYN 344 or PENTALYN A) | 47.5 |
| (c) Plasticizer-Binder Ethylene-Vinyl Acetate Copolymer (e.g. ELVAX 410) | 7.5 |
| | 100.0 |

We claim:

1. In a heat transferable laminate of the type including a carrier support and a solvent-based release layer coated onto the carrier support and wherein the solvent-based release layer is dried to evaporate the solvent contained therein and an ink design layer applied over the dried release layer forming a heat transferable substrate comprising the dried release layer and ink design layer, the substrate transferable from the carrier support to a receiving article upon application of heat to the carrier while said receiving article contacts the transferable substrate, an improved solvent-based release composition prior to drying comprising:

a oxidized, esterified, partially saponified montan wax component;

a film-forming binder comprising a thermoplastic resin selected from the group consisting of a rosin ester and a hydrocarbon resin, said rosin ester comprising pentaerythritol ester of rosin and said hydrocarbon resin comprising the product resulting from polymerization and hydrogenation of hydrocarbon monomer.

a plasticizer-binder comprising ethylene vinyl acetate copolymer; and a liquid solvent;

the montan wax, film-forming binder and plasticizer binder being dissolved in said solvent to form a homogeneous solution, said homogeneous solution having a gel point temperature of less than 140° F., said gel point temperature achieved by subjecting the solvent-based release composition to a temperature above its dissolving temperature.

2. A heat transferable laminate as in claim 1 wherein the dried release layer has a drop melting point higher than about 95° C., permitting transfer of the substrate at a temperature between about 300° F. to 600° F. in less than two seconds, and resolidifies after transfer to provide a transparent, glossy, scuff resistent coating having a drop melting point higher than about 95° C.

3. A heat transferable laminate as in claim 1, wherein the rosin ester is a pentaerythritol ester of resin acids of the abietic and pimaric type having a phenanthrene nucleus.

4. A heat transferable laminate as in claim 1 wherein the hydrocarbon monomers comprise unsaturated cyclic hydrocarbon.

5. A heat transferable laminate as in claim 1, wherein the ethylene-vinyl acetate copolymer comprises less than 24 percent by weight vinyl acetate.

6. A heat transferable laminate as in claim 1, wherein the solvent comprises toluene.

7. A heat transferable laminate as in claim 1, wherein the montan wax comprises between about 16 and 20 percent by weight of the solvent-based release.

8. A heat transferable laminate as in claim 1, wherein the film-forming binder comprises between about 17 to 21 percent by weight of the solvent-based release.

9. A heat transferable laminate as in claim 1, wherein the ethylene-vinyl acetate copolymer comprises between about 2 to 4 percent by weight of the solvent-based release.

10. A heat transferable laminate as in claim 1 wherein said solution has a gel point of between about 75° F. and 100° F., said gel point temperature is achieved by subjecting the solvent-based release composition to a temperature above about 250° F. for a period of at least about five minutes.

11. A heat transferable laminate as in claim 1, wherein the solvent-based release composition is subjected to said temperature above its dissolving temperature for a period of at least about five minutes.

12. A heat transferable laminate as in claim 11 wherein the homogeneous solution is formed by subjecting the solvent-based release composition to a temperature between its dissolving temperature and about 300° F.

13. In a heat transferable laminate of the type including a carrier support and a solvent-based release layer coated onto the carrier support and wherein the solvent-based release layer is dried to evaporate the solvent contained therein and an ink design layer applied over the dried release layer forming a heat transferable substrate comprising the dried release layer and ink design layer, the substrate transferable from the carrier support to a receiving article upon application of heat to the carrier while said receiving article contacts the transferable substrate, an improved solvent-based release composition prior to drying comprising:

a montan wax component;

a film-forming thermoplastic binder, comprising a thermoplastic resin selected from the group consisting of a rosin ester and a hydrocarbon resin, said rosin ester comprising pentaerythritol ester of rosin and said hydrocarbon resin comprising the product resulting from polymerization and hydrogenation of hydrocarbon monomer;

a plasticizer-binder comprising ethylene-vinyl acetate copolymer; and a liquid solvent;

the montan wax, film-forming binder and plasticizer binder being dissolved in said solvent to form a homogeneous solution, said homogeneous solution having a gel point of between about 75° F. and 100° F., said gel point temperature achieved by subjecting the solvent-based release composition to a temperature above its dissolving temperature.

14. A method of preparing a solvent-based release composition for use as a release coating in heat tranferable laminates which comprises:

(a) preparing a mixture comprising a montan wax component; a film-forming binder comprising a thermoplastic resin selected from the group consisting of a rosin ester and a hydrocarbon resin; a plasticizer-binder comprising ethylene-vinyl acetate copolymer; and a liquid solvent, (b) heating said mixture to a temperature above its dissolving temperature, (c) maintaining the mixture in step (b) at the temperature above the dissolving temperature for a period of at least five minutes forming a homogeneous solution, wherein said solution upon cooling has a gel point temperature of between about 75° F. to 100° F.

15. A method as in claim 14 wherein the temperature at which the mixture is maintained in step (c) is above about 250° F.

16. A method as in claim 14 wherein the liquid solvent is toluene.

17. A method as in claim 14 wherein the montan wax component is an oxidized, esterified, partially saponified montan wax.

* * * * *